United States Patent
Oyama et al.

(10) Patent No.: US 10,566,622 B2
(45) Date of Patent: Feb. 18, 2020

(54) CATHODE MATERIAL FOR LITHIUM-ION SECONDARY BATTERY AND METHOD FOR MANUFACTURING THE SAME, CATHODE FOR LITHIUM-ION SECONDARY BATTERY, AND LITHIUM-ION SECONDARY BATTERY

(71) Applicant: SUMITOMO OSAKA CEMENT CO., LTD., Tokyo (JP)

(72) Inventors: Masataka Oyama, Tokyo (JP); Takao Kitagawa, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 0 days.

(21) Appl. No.: 15/936,066

(22) Filed: Mar. 26, 2018

(65) Prior Publication Data

US 2019/0097230 A1  Mar. 28, 2019

(30) Foreign Application Priority Data

Sep. 28, 2017  (JP) .................................. 2017-187449

(51) Int. Cl.
| | |
|---|---|
| *H01M 4/13* | (2010.01) |
| *H01M 4/58* | (2010.01) |
| *H01M 4/36* | (2006.01) |
| *H01M 4/62* | (2006.01) |
| *H01M 10/0525* | (2010.01) |
| *C01B 25/45* | (2006.01) |
| *H01M 4/1397* | (2010.01) |
| *H01M 4/02* | (2006.01) |

(52) U.S. Cl.
CPC ........... *H01M 4/5825* (2013.01); *C01B 25/45* (2013.01); *H01M 4/1397* (2013.01); *H01M 4/366* (2013.01); *H01M 4/625* (2013.01); *H01M 10/0525* (2013.01); *C01P 2004/50* (2013.01); *C01P 2004/51* (2013.01); *C01P 2004/61* (2013.01); *C01P 2004/80* (2013.01); *C01P 2006/40* (2013.01); *H01M 2004/028* (2013.01); *H01M 2220/20* (2013.01)

(58) Field of Classification Search
CPC .... H01M 4/366; H01M 4/5825; H01M 4/625; H01M 10/0525; H01M 4/1397; H01M 10/052; H01M 2004/0028; H01M 2220/20; C01B 25/45; C01P 2004/51; C01P 2004/50; C01P 2004/80; C01P 2004/61; C01P 2006/40

See application file for complete search history.

(56) References Cited

U.S. PATENT DOCUMENTS

| | | | |
|---|---|---|---|
| 2013/0052535 A1* | 2/2013 | Yanagihara | H01M 4/485 429/220 |
| 2016/0036042 A1* | 2/2016 | Forbert | C01B 25/45 429/221 |
| 2018/0097225 A1 | 4/2018 | Yamaya et al. | |

FOREIGN PATENT DOCUMENTS

| | | |
|---|---|---|
| JP | 2004-014340 A | 1/2004 |
| JP | 6288340 B | 3/2008 |
| JP | 2009-004371 A | 1/2009 |
| JP | 2011-049161 A | 3/2011 |
| JP | 2012-104290 A | 5/2012 |
| JP | 2012-195156 A | 10/2012 |
| JP | 2015-069822 A | 4/2015 |
| JP | 2016-524307 A | 8/2016 |
| JP | 2017-143049 A | 8/2017 |
| JP | 6176381 B | 8/2017 |
| KR | 20170004461 A * | 1/2017 |
| WO | 2011/030786 A1 | 3/2011 |
| WO | 2015/006058 A1 | 1/2015 |

OTHER PUBLICATIONS

Machine translation for KR 20170004461 A. (Year: 2018).*
Office Action for for Japanese Patent Application No. 2017-187449 (dated Feb. 6, 2018).
Notice of Allowance for Japanese Patent Application No. 2017-187449 (dated Apr. 3, 2018).

* cited by examiner

*Primary Examiner* — Raymond Alejandro
(74) *Attorney, Agent, or Firm* — Merchant & Gould P.C.

(57) ABSTRACT

A cathode material for a lithium-ion secondary battery, the cathode material including: secondary particles which are granulated active material particles including central particles and a carbonaceous film that coats surfaces of the central particles, wherein a granulated body breakage degree ((a−b)/a) of the secondary particles is 0.03 or more and 0.30 or less, and the granulated body breakage degree is calculated based on a relative particle amount a, at which a maximum peak is shown in a particle size distribution of the secondary particles, and a relative particle amount b, at which a maximum peak in a particle size distribution of the secondary particles is shown after a dispersion treatment of the secondary particles is performed using a homogenizer.

10 Claims, 2 Drawing Sheets

CATHODE MATERIAL FOR LITHIUM-ION SECONDARY BATTERY AND METHOD FOR MANUFACTURING THE SAME, CATHODE FOR LITHIUM-ION SECONDARY BATTERY, AND LITHIUM-ION SECONDARY BATTERY

CROSS-REFERENCE TO RELATED APPLICATIONS

This application claims the benefit of Japanese Patent Application No. 2017-187449 filed Sep. 28, 2017, the disclosure of which is herein incorporated by reference in its entirety.

BACKGROUND OF THE INVENTION

Field of the Invention

The present invention relates to a cathode material for a lithium-ion secondary battery and a method for manufacturing the same, a cathode for a lithium-ion secondary battery, and a lithium-ion secondary battery.

Description of Related Art

In recent years, as batteries anticipated to have a small size and a high capacity and weigh less, non-aqueous electrolytic solution-based secondary batteries such as lithium-ion secondary batteries have been proposed and put into practical use. Lithium-ion secondary batteries are constituted of a cathode and an anode which have properties capable of reversibly intercalating and deintercalating lithium ions, and a non-aqueous electrolyte.

As anode active materials for anode materials of lithium-ion secondary batteries, generally, carbon-based materials or Li-containing metal oxides having properties capable of reversibly intercalating and deintercalating lithium ions are used. Examples of the Li-containing metal oxides include lithium titanate ($Li_4Ti_5O_{12}$).

Meanwhile, as cathodes of lithium-ion secondary batteries, cathode material mixtures including a cathode material, a binder, and the like are used. As a cathode active material, for example, Li-containing metal oxides having properties capable of reversibly intercalating and deintercalating lithium ions such as lithium iron phosphate ($LiFePO_4$) are used. In addition, cathodes of lithium-ion secondary batteries are formed by applying the cathode material mixture onto the surface of a metal foil that is called an electrode current collector.

As electrolytic solutions for lithium-ion secondary batteries, non-aqueous solvents are used. Non-aqueous solvents enable the application of cathode active materials that are oxidized and reduced at a high potential or anode active materials that are oxidized and reduced at a low potential. Therefore, lithium-ion secondary batteries having a higher voltage can be realized.

These lithium-ion secondary batteries have a small size and a higher energy and weigh less than secondary batteries in the related art such as lead batteries, nickel cadmium batteries, and nickel metal hydride batteries. Therefore, lithium-ion secondary batteries are used not only as small-sized power supplies used in portable electronic devices such as mobile phones and notebook personal computers but also as large-sized stationary emergency power supplies.

In recent years, there has been a demand for the performance improvement of lithium-ion secondary batteries, and a variety of studies have been carried out. For example, in a case in which a lithium-ion secondary battery is used in a high-current density region, there is a demand for additional improvement in electron conductivity in order to improve the performance. Regarding the above-described property demands, techniques for coating the surfaces of cathode active materials with a carbonaceous material (hereinafter, in some cases, referred to as "carbonaceous film") are known. As these methods for manufacturing cathode materials, it is known to spray and dry a slurry including a cathode active material or a precursor of the cathode active material and an organic compound so as to generate granulated bodies and thermally treat these granulated bodies in a non-oxidative atmosphere at 500° C. or higher and 1,000° C. or lower (for example, refer to Japanese Laid-open Patent Publication No. 2004-014340, Japanese Laid-open Patent Publication No. 2009-004371, Japanese Laid-open Patent Publication No. 2011-049161, and Japanese Laid-open Patent Publication No. 2012-104290).

SUMMARY OF THE INVENTION

In order to manufacture lithium-ion secondary batteries having excellent input and output characteristics, it is necessary to make the structure in an electrode uniform. In order for that, it is preferable to enhance the uniformity of slurries using a kneader having favorable dispersion performance. However, in a case in which granulated bodies made of primary particles having a conductive carbonaceous film on the particle surfaces as described in Japanese Laid-open Patent Publication No. 2004-014340 are used as a cathode material, when a kneader having favorable dispersion performance is used, a strong shear force is applied to the granulated bodies. Therefore, the granulated bodies break, and there is a problem in that the electron conductivity degrades and consequently the rate characteristics deteriorate.

The present invention has been made in consideration of the above-described circumstances, and an object of the present invention is to provide a cathode material for a lithium-ion secondary battery of which the electron conductivity does not easily decrease due to the breakage of granulated bodies even in a case in which a kneader having high dispersion performance is used and a method for manufacturing the same, a cathode for a lithium-ion secondary battery including the cathode material for a lithium-ion secondary battery, and a lithium-ion secondary battery including the cathode for a lithium-ion secondary battery.

The present inventors and the like carried out intensive studies in order to achieve the above-described object, consequently found that, when a cathode material for a lithium-ion secondary battery is made of secondary particles obtained by granulating active material particles including central particles and a carbonaceous film that coats the surfaces of the central particles, and a granulated body breakage degree ((a−b)/a) which is calculated from a relative particle amount a with the maximum peak in the particle size distribution of the secondary particles and a relative particle amount b with the maximum peak in the particle size distribution measured after a dispersion treatment of the secondary particles using a homogenizer is set to 0.03 or more and 0.30 or less, even in a case in which a kneader having favorable dispersion performance is used, granulated bodies do not easily break, and it is possible to suppress the electron conductivity being degraded by the breakage of the granulated bodies, and completed the present invention.

A cathode material for a lithium-ion secondary battery of the first aspect of the present invention which is made of secondary particles obtained by granulating active material particles including central particles and a carbonaceous film that coats surfaces of the central particles, in which a granulated body breakage degree ((a−b)/a) which is calculated from a relative particle amount a with a maximum peak in a particle size distribution of the secondary particles and a relative particle amount b with a maximum peak in a particle size distribution measured after a dispersion treatment of the secondary particles using a homogenizer is 0.03 or more and 0.30 or less.

In other words, the present invention provides a cathode material for a lithium-ion secondary battery, the cathode material comprising: secondary particles which are granulated active material particles including central particles and a carbonaceous film that coats surfaces of the central particles, wherein a granulated body breakage degree ((a−b)/a) of the secondary particles is 0.03 or more and 0.30 or less, and the granulated body breakage degree is calculated based on a relative particle amount a, at which a maximum peak is shown in a particle size distribution of the secondary particles, and a relative particle amount b, at which a maximum peak in a particle size distribution of the secondary particles is shown after a dispersion treatment of the secondary particles is performed using a homogenizer.

It is preferable that the cathode material described above preferably has the following characteristics. The following characteristics may be combined with each other.

The cathode material may consist of the secondary particles.

The secondary particles may consist of the granulated active material particles.

The central particles may consist essentially of a compound represented by general formula $Li_xFe_yM_zPO_4$.

The central particles may consist essentially of a compound represented by general formula $LiFePO_4$.

A cathode for a lithium-ion secondary battery of the second aspect of the present invention is a cathode for a lithium-ion secondary battery including an electrode current collector and a cathode mixture layer formed on the electrode current collector, in which the cathode mixture layer includes the cathode material for a lithium-ion secondary battery of the present invention.

A lithium-ion secondary battery of the third aspect of the present invention includes the cathode for a lithium-ion secondary battery of the present invention.

A method for manufacturing a cathode material for a lithium-ion secondary battery of the fourth aspect of the present invention is a method for manufacturing the cathode material for a lithium-ion secondary battery of the present invention, the method including manufacturing central particles or a precursor of the central particles, preparing a slurry by dissolving or dispersing at least one central particle raw material selected from the group consisting of the central particles and the precursor of the central particles and an organic compound in water, and drying the slurry and calcinating an obtained dried substance in a non-oxidative atmosphere, in which, in the preparing of the slurry, a ratio (median diameter/crystallite diameter) of a median diameter in a particle size distribution of the central particles after the dispersion treatment to a crystallite diameter which is calculated from crystallite diameters of the central particles before the dispersion treatment is 1.00 or more and 2.10 or less, and the median diameter after the dispersion is adjusted to 100 nm or more and 160 nm.

In other words, the present invention provides a method for manufacturing the cathode material for a lithium-ion secondary battery according to Claim 1, the method comprising: manufacturing central particles and/or a precursor of the central particles; preparing a slurry by dissolving or dispersing an organic compound and at least one central particle raw material, which is selected from the group consisting of the central particles and the precursor of the central particles, in water; and drying the slurry to generate dried substance and calcinating the obtained dried substance in a non-oxidative atmosphere, wherein, in the preparing of the slurry, a median diameter of the central particles in a particle size distribution, which is evaluated after dispersion treatment in the preparing the slurry, is adjusted to 100 nm or more and 160 nm or less, and a ratio (median diameter/crystallite diameter) of the median diameter to a crystallite diameter, which is calculated from crystallite diameters of the central particles before the dispersion treatment, is adjusted to 1.00 or more and 2.10 or less.

EFFECTS OF THE INVENTION

According to the cathode material for a lithium-ion secondary battery of the present invention, since the cathode material for a lithium-ion secondary battery is made of secondary particles obtained by granulating active material particles including central particles and a carbonaceous film that coats the surfaces of the central particles, and the granulated body breakage degree ((a−b)/a) which is calculated from the relative particle amount a with the maximum peak in the particle size distribution of the secondary particles and the relative particle amount b with the maximum peak in the particle size distribution measured after a dispersion treatment of the secondary particles using a homogenizer is 0.03 or more and 0.30 or less, it is possible to provide cathode materials for a lithium-ion secondary battery in which, even in a case in which a kneader having favorable dispersion performance is used, granulated bodies do not easily break, and it is possible to suppress the electron conductivity being degraded by the breakage of the granulated bodies.

According to the cathode for a lithium-ion secondary battery of the present invention, since the cathode material for a lithium-ion secondary battery of the present invention is included, cathodes for a lithium-ion secondary battery in which the structure in the electrode is uniform and the electron conductivity in the electrode is high can be obtained.

According to the lithium-ion secondary battery of the present invention, since the cathode for a lithium-ion secondary battery of the present invention is included, lithium-ion secondary batteries having excellent rate characteristics can be obtained.

According to the method for manufacturing a cathode material for a lithium-ion secondary battery of the present invention, since, in the preparing of the slurry, the ratio (median diameter/crystallite diameter) of the median diameter in the particle size distribution of the central particles after the dispersion treatment to the crystallite diameter which is calculated from the crystallite diameters of the central particles before the dispersion treatment is used as an index, and the agglomeration degree of the central particles is adjusted, it is possible to obtain a cathode material for a lithium-ion secondary battery in which the granulated body breakage degree ((a−b)/a) which is calculated from the relative particle amount a with the maximum peak in the particle size distribution of the secondary particles and the relative particle amount b with the maximum peak in the particle size distribution measured after a dispersion treatment of the secondary particles using a homogenizer is 0.03 or more and 0.30 or less.

DETAILED DESCRIPTION OF THE INVENTION

Preferable embodiments and preferable examples of a cathode material for a lithium-ion secondary battery, a cathode for a lithium-ion secondary battery, and a lithium-ion secondary battery of the present invention will be described below.

Meanwhile, the present embodiments are specific description for better understanding of the gist of the present invention and does not limit the present invention unless particularly otherwise described. Addition, omission, substitution, and other modification of the constitution are allowed within the scope of the present invention.

Cathode Material for Lithium-Ion Secondary Battery

A cathode material for a lithium-ion secondary battery of the present embodiment is made of secondary particles obtained by granulating active material particles including central particles and a carbonaceous film that coats surfaces of the central particles, and a granulated body breakage degree ((a−b)/a) which is calculated from a relative particle amount a with a maximum peak in a particle size distribution of the secondary particles and a relative particle amount b with a maximum peak in a particle size distribution measured after a dispersion treatment of the secondary particles using a homogenizer is 0.03 or more and 0.30 or less.

The granulated body breakage degree ((a−b)/a) which is calculated from the relative particle amount a with the maximum peak in the particle size distribution of the secondary particles and the relative particle amount b with the maximum peak in the particle size distribution measured after a dispersion treatment of the secondary particles using a homogenizer is 0.03 or more and 0.30 or less and preferably 0.07 or more and 0.25 or less.

When the granulated body breakage degree is less than 0.03, the secondary particles seldom break during the kneading of slurries including the cathode material for a lithium-ion secondary battery, and thus the contact frequency with an electrode current collector decreases, and the electron conductivity between the electrode current collector and an active material degrades. Meanwhile, when the granulated body breakage degree exceeds 0.30, the secondary particles easily break during the kneading of slurries including the cathode material for a lithium-ion secondary battery, and it is not possible to suppress the electron conductivity being degraded by the breakage of the secondary particles.

The particle size distribution of the secondary particles measured after a dispersion treatment of the cathode material for a lithium-ion secondary battery using a homogenizer preferably has a maximum peak in a range of 1.0 μm or more and 45.0 μm or less and more preferably has a maximum peak in a range of 2.0 μm or more and 25.0 μm or less.

When the particle size distribution of the secondary particles has a maximum peak at 1.0 μm or more, the viscosity of a slurry including the cathode material for a lithium-ion secondary battery decreases, and the property of the slurry being applied to the electrode current collector becomes favorable. Meanwhile, when the particle size distribution of the secondary particles has a maximum peak at 45.0 μm or less, it is possible to decrease unevenness on the surface of a cathode mixture layer formed on the electrode current collector using the slurry including the cathode material for a lithium-ion secondary battery, and thus it is possible to suppress short-circuiting or the current density becoming uneven.

The secondary particles forming the cathode material for a lithium-ion secondary battery of the present embodiment are particles obtained by granulating active material particles (primary particles) including central particles and a carbonaceous film that coats the surfaces of the central particle. The secondary particles in the present embodiment have micropores (pores) between the active material particles (primary particles) constituting the secondary particles.

The micropore diameter of the secondary particle forming the cathode material for a lithium-ion secondary battery of the present embodiment is preferably 80 nm or more and 1,000 nm or less and more preferably 100 nm or more and 500 nm or less.

When the micropore diameter of the secondary particle is 80 nm or more, it becomes easy for electrolytic solutions to penetrate into the inside of the secondary particle, and the migration of lithium ions in the secondary particles becomes easy. Meanwhile, when the micropore diameter of the secondary particle is 1,000 nm or less, the contact frequency between the active material particles (primary particles) is high, and the strength of the secondary particles increases. Therefore, the secondary particles do not easily break during the kneading of slurries including the cathode material for a lithium-ion secondary battery, and it is possible to suppress the electron conductivity being degraded due to the breakage of the secondary particles.

The micropore diameter of the secondary battery can be measured using a mercury porosimeter (a mercury intrusion method, apparatus name: POREMASTER, manufactured by Quantachrome Instruments Japan G.K.).

The average primary particle diameter of the active material particles in the cathode material for a lithium-ion secondary battery of the present embodiment is preferably 10 nm or more and 700 nm or less and more preferably 20 nm or more and 500 nm or less.

When the average primary particle diameter of the active material particles is 10 nm or more, the specific surface area of the cathode material for a lithium-ion secondary battery increases, and thus an increase in the mass of necessary carbon is suppressed, and it is possible to suppress a decrease in the charge and discharge capacity of lithium-ion secondary batteries. Meanwhile, when the average primary particle diameter of the active material particles is 700 nm or less, it is possible to suppress the extension of time for lithium ions or electrons to migrate in the cathode material for a lithium-ion secondary battery. Therefore, it is possible to suppress an increase in the internal resistance of lithium-ion secondary batteries and the consequent deterioration of the output characteristics.

Here, the average particle diameter refers to the volume-average particle diameter. The average primary particle diameter of the active material particles can be measured using a laser diffraction and scattering particle size distribution measurement instrument or the like. In addition, it is also possible to arbitrarily select a plurality of primary particles observed using a scanning electron microscope (SEM) and calculate the average particle diameter of the primary particles.

The BET specific surface area of the cathode material for a lithium-ion secondary battery is preferably 5 m$^2$/g or more and 25 m$^2$/g or less.

When the BET specific surface area is 5 m$^2$/g or more, the coarsening of the cathode material for a lithium-ion secondary battery is suppressed, and it is possible to increase the diffusion rate of lithium ions in the particles. Therefore, it is possible to improve the battery characteristics of lithium-ion secondary batteries. In addition, the contact frequency between the active material particles in the secondary particles increases, and thus it is possible to increase the strength of the secondary particles. Meanwhile, when the BET specific surface area is 25 m$^2$/g or less, it is possible to prevent an excessive increase in the porosity of a cathode including the cathode material for a lithium-ion secondary battery of the present embodiment. Therefore, it is possible to provide lithium-ion secondary batteries having a high energy density.

The BET specific surface area of the cathode material for a lithium-ion secondary battery can be measured using a method described in the examples.

The average secondary particle diameter of the cathode material for a lithium-ion secondary battery is preferably 1.0 μm or more and 45.0 μm or less and more preferably 3.0 μm or more and 25.0 μm or less.

When the average secondary particle diameter is 1.0 μm or more, the viscosity of the slurry including the cathode material for a lithium-ion secondary battery decreases, and the property of the slurry being applied to the electrode current collector becomes favorable. Meanwhile, when the average secondary particle diameter is 45.0 μm or less, it is possible to decrease unevenness on the surface of the cathode mixture layer formed on the electrode current collector using the slurry including the cathode material for a lithium-ion secondary battery, and thus it is possible to suppress short-circuiting or the current density becoming uneven.

The amount of carbon included in the cathode material for a lithium-ion secondary battery, that is, the amount of carbon forming the carbonaceous film is preferably 0.1 parts by mass or more and 10 parts by mass or less and more preferably 0.6 parts by mass or more and 3 parts by mass or less with respect to 100 parts by mass of the central particles.

When the amount of carbon is 0.1 parts by mass or more, the discharge capacity at a high charge-discharge rate of lithium-ion secondary batteries increases, and it is possible to realize sufficient charge and discharge rate performance. Meanwhile, when the amount of carbon is 10 parts by mass or less, it is possible to suppress the battery capacity of lithium-ion secondary batteries per unit mass of the cathode material for a lithium-ion secondary battery being decreased more than necessary.

The proportion of the amount of carbon in the specific surface area of the cathode material for a lithium-ion secondary battery ("[the amount of carbon]/[the specific surface area of the primary particles of the cathode material]") is preferably 0.01% by mass·g/m$^2$ or more and 0.5% by mass·g/m$^2$ or less and more preferably 0.03% by mass·g/m$^2$ or more and 0.3% by mass·g/m$^2$ or less.

When the proportion of the amount of carbon is 0.01% by mass·g/m$^2$ or more, the discharge capacity at a high-speed charge and discharge rate of the lithium-ion secondary battery increases, and it is possible to realize sufficient charge and discharge rate performance. Meanwhile, when the proportion of the amount of carbon is 0.5% by mass·g/m$^2$ or less, it is possible to suppress the battery capacity of lithium-ion secondary batteries per unit mass of the cathode material for a lithium-ion secondary battery being decreased more than necessary.

Central Particles

The central particles constituting the cathode material for a lithium-ion secondary battery of the present embodiment are not particularly limited as long as the particles are electrochemically active; however, when the central particles area composition represented by General Formula $Li_xFe_yM_zPO_4$ (here, M represents at least one element selected from the group consisting of Mg, Ca, Co, Sr, Ba, Ti, Zn, B, Al, Ga, In, Si, Ge, and rare earth elements, $0.95 \leq x \leq 1.10$, $0.80 \leq y \leq 1.10$, and $0.00 \leq z \leq 0.20$), the rate characteristics of lithium-ion secondary batteries become favorable.

Meanwhile, the rare earth elements refer to 15 elements of La, Ce, Pr, Nd, Pm, Sm, Eu, Gd, Tb, Dy, Ho, Er, Tm, Yb, and Lu which are in the lanthanum series.

Examples of the compound represented by General Formula $Li_xFe_yM_zPO_4$ include $LiFePO_4$, $LiFe_{0.95}Mg_{0.05}PO_4$, $Li_{0.95}Fe_{0.95}Al_{0.05}PO_4$, and the like. Among these, $LiFePO_4$ is preferred since metals not exhibiting the electrochemical activity are not included, and the theoretical energy density increases most.

The average primary particle diameter of the primary particles of the central particles constituting the cathode material for a lithium-ion secondary battery of the present embodiment is preferably 5 nm or more and 800 nm or less and more preferably 20 nm or more and 500 nm or less.

When the average primary particle diameter of the primary particles of the central particles is 5 nm or more, it is possible to sufficiently coat the surfaces of the primary particles of the central particle with the carbonaceous film. In addition, the discharge capacity in the high-speed charge and discharge of lithium-ion secondary batteries increases, and it is possible to realized sufficient charge and discharge performance. Meanwhile, when the average primary particle diameter of the primary particles of the central particles is 800 nm or less, it is possible to decrease the internal resistance of the primary particles of the central particles. In addition, it is possible to increase the discharge capacity in the high-speed charge and discharge of lithium-ion secondary batteries.

The shape of the primary particle of the central particle constituting the cathode material for a lithium-ion secondary battery of the present embodiment is not particularly limited, but the shape of the primary particle of the central particle is preferably a spherical shape since a cathode active material made of spherical, particularly, truly spherical agglomerates is easily generated.

When the shape of the primary particle of the central particle is a spherical shape, it is possible to decrease the amount of a solvent when a slurry is prepared by mixing the cathode material for a lithium-ion secondary battery, a binder resin (binder), and the solvent. In addition, when the shape of the primary particle of the central particle is a spherical shape, the application of the slurry to the electrode current collector becomes easy. Furthermore, when the shape of the primary particle of the central particle is a spherical shape, the surface area of the primary particle of the central particle is minimized, and it is possible to minimize the amount of the binder resin (binder) blended into the slurry. As a result, it is possible to decrease the internal resistance of cathodes for which the cathode material for a lithium-ion secondary battery of the present embodiment is used. In addition, when the shape of the primary particle of the central particle is a spherical shape, it becomes easy to closely pack the cathode material for a lithium-ion secondary battery, and thus the amount of the cathode material for a lithium-ion secondary battery packed per unit volume of the cathode increases. As a result, it is possible to increase the cathode density, and high-capacity lithium-ion secondary batteries can be obtained.

Carbonaceous Film

The carbonaceous film coats the surfaces of the central particles.

When the surfaces of the central particles are coated with the carbonaceous film, it is possible to improve the electron conductivity of the cathode material for a lithium-ion secondary battery.

The carbonaceous film is a pyrolytic carbonaceous film derived from a thermally treated organic compound, and the thickness of the carbonaceous film is preferably 0.2 nm or more and 10 nm or less and more preferably 0.5 nm or more and 4 nm or less.

When the thickness of the carbonaceous film is 0.2 nm or more, it is possible to prevent the excessively thin thickness of the carbonaceous film from disabling the formation of films having a desired resistance value. In addition, it is possible to ensure a conductivity suitable for the cathode material for a lithium-ion secondary battery. Meanwhile, when the thickness of the carbonaceous film is 10 nm or less, it is possible to suppress a decrease in the battery capacity per unit mass of the cathode material for a lithium-ion secondary battery.

In addition, when the thickness of the carbonaceous film is 0.2 nm or more and 10 nm or less, it becomes easy to closely pack the cathode material for a lithium-ion secondary battery, and thus the amount of the cathode material for a lithium-ion secondary battery packed per unit volume of the cathode increases. As a result, it is possible to increase the cathode density, and high-capacity lithium-ion secondary batteries can be obtained.

The coating ratio of the carbonaceous film to the central particles is preferably 60% or more and 95% or less and more preferably 80% or more and 95% or less. When the coating ratio of the carbonaceous film is 60% or more, the coating effect of the carbonaceous film can be sufficiently obtained.

The density of the carbonaceous film, which is calculated using the carbon component in the carbonaceous film, is preferably 0.3 g/cm$^3$ or more and 1.5 g/cm$^3$ or less and more preferably 0.4 g/cm$^3$ or more and 1.0 g/cm$^3$ or less.

Here, the reasons for limiting the density of the carbonaceous film, which is calculated using the carbon component in the carbonaceous film, to the above-described range are as described below. When the density of the carbonaceous film, which is calculated using the carbon amount in the carbonaceous film, is 0.3 g/cm$^3$ or more, the carbonaceous film exhibits sufficient electron conductivity. Meanwhile, when the density of the carbonaceous film is 1.5 g/cm$^3$ or less, the amount of the fine crystals of graphite made of a lamellar structure in the carbonaceous film is small, and thus no steric hindrance is generated by the fine crystals of the graphite during the diffusion of lithium ions in the carbonaceous film. Therefore, there are no cases in which the lithium ion migration resistance increases. As a result, there are no cases in which the internal resistance of lithium-ion secondary batteries increases, and voltage drop does not occur at a high charge-discharge rate of lithium-ion secondary batteries.

According to the cathode material for a lithium-ion secondary battery of the present embodiment, the cathode material for a lithium-ion secondary battery is made of the secondary particles obtained by granulating the active material particles including the central particles and the carbonaceous film that coats the surfaces of the central particles, and the granulated body breakage degree ((a–b)/a) which is calculated from the relative particle amount a with the maximum peak in the particle size distribution of the secondary particles and the relative particle amount b with the maximum peak in the particle size distribution measured after a dispersion treatment of the secondary particles using a homogenizer is set to 0.03 or more and 0.30 or less, and thus it is possible to provide cathode materials for a lithium-ion secondary battery in which, even in a case in which a kneader having favorable dispersion performance is used, granulated bodies do not easily break, and it is possible to suppress the electron conductivity being degraded by the breakage of the granulated bodies.

Method for Manufacturing Cathode Material for Lithium-Ion Secondary Battery

A method for manufacturing the cathode material for a lithium-ion secondary battery in the present embodiment includes, for example, a manufacturing step of the central particles and a precursor of the central particles, a slurry preparation step of preparing a slurry by dissolving or dispersing at least one central particle raw material selected from the group consisting of the central particles and the precursor of the central particles and an organic compound which is a carbonaceous film precursor in water, and a calcination step of drying the slurry and calcinating the obtained dried substance in a non-oxidative atmosphere.

Step of Manufacturing Central Particles and Precursor of Central Particles

As a method for manufacturing the compound (the central particles) represented by General Formula $Li_xFe_yM_zPO_4$ (here, M represents at least one element selected from the group consisting of Mg, Ca, Co, Sr, Ba, Ti, Zn, B, Al, Ga, In, Si, Ge, and rare earth elements, $0.95 \leq x \leq 1.10$, $0.80 \leq y \leq 1.10$, and $0.00 \leq z \leq 0.20$), a method of the related art such as a solid phase method, a liquid phase method, or a gas phase method is used. Examples of $Li_xFe_yM_zPO_4$ obtained using the above-described method include particulate substances (hereinafter, in some cases, referred to as "$Li_xFe_yM_zPO_4$ particles").

The $Li_xFe_yM_zPO_4$ particles are obtained by, for example, hydrothermally synthesizing a slurry-form mixture obtained by mixing a Li source, a Fe source, a P source, water, and, if necessary, an M source. By means of the hydrothermal synthesis, $Li_xFe_yM_zPO_4$ is generated as a precipitate in water. The obtained precipitate may be a precursor of $Li_xFe_yM_zPO_4$. In this case, target $Li_xFe_yM_zPO_4$ particles are obtained by calcinating the precursor of $Li_xFe_yM_zPO_4$.

In this hydrothermal synthesis, a pressure-resistant airtight container is preferably used.

Here, examples of the Li source include lithium salts such as lithium acetate ($LiCH_3COO$) and lithium chloride (LiCl), lithium hydroxide (LiOH), and the like. Among these, as the Li source, at least one selected from the group consisting of lithium acetate, lithium chloride, and lithium hydroxide is preferably used.

Examples of the Fe source include divalent iron salts such as iron (II) chloride ($FeCl_2$), iron (II) acetate ($Fe(CH_3COO)_2$), and iron (II) sulfate ($FeSO_4$). Among these, as the Fe source, at least one selected from the group consisting of iron (II) chloride, iron (II) acetate, and iron (II) sulfate is preferably used.

Examples of the P source include phosphoric acid compounds such as phosphoric acid ($H_3PO_4$), ammonium dihydrogen phosphate ($NH_4H_2PO_4$), diammonium hydrogen phosphate (($NH_4)_2HPO_4$), and the like. Among these, as the P source, at least one selected from the group consisting of phosphonic acid, ammonium dihydrogen phosphate, and diammonium hydrogen phosphate is preferably used.

Examples of the M source include chlorides, carboxylates, sulfates, and the like including at least one element selected from the group consisting of Mg, Ca, Co, Sr, Ba, Ti, Zn, B, Al, Ga, In, Si, Ge, and rare earth elements.

Slurry Preparation Step

By means of the slurry preparation step, the organic compound which is the precursor of the carbonaceous film is interposed among the central particles, and the organic compound and the central particles are uniformly mixed together, and thus the surfaces of the central particles can be uniformly coated with the organic compound.

The central particle raw material and the organic compound are dissolved or dispersed in water, thereby preparing a homogeneous slurry. During this dissolution or dispersion, a dispersant may be added thereto or the organic compound which is a carbon source may be imparted with a function of a dispersant.

A method for dissolving or dispersing the central particle raw material and the organic compound in water is not particularly limited as long as the electrode active material is dispersed and the organic compound is dissolved or dispersed, and is, for example, preferably a method in which a medium stirring-type dispersion device such as a ball mill or a sand mill is used.

In addition, it is possible to adjust the contact frequency between the active material particles in the secondary particles and control the strength (granulated body breakage degree) of the secondary particles by adjusting the agglomeration degree of the central particles.

Furthermore, by means of the calcination step, the organic compound that coats the surfaces of the central particles is carbonized, thereby obtaining cathode active material particles (cathode material) including the central particles that are uniformly coated with the carbonaceous film.

The organic compound that is used in the method for manufacturing a cathode active material in the present embodiment is not particularly limited as long as the compound is capable of forming the carbonaceous film on the surfaces of the central particles. Examples of the above-described organic compound include divalent alcohols such as polyvinyl alcohol (PVA), polyvinyl pyrrolidone, cellulose, starch, gelatin, carboxymethyl cellulose, methyl cellulose, hydroxymethyl cellulose, hydroxyethyl cellulose, polyacrylic acid, polystyrene sulfonate, polyacrylamide, polyvinyl acetate, glucose, fructose, galactose, mannose, maltose, sucrose, lactose, glycogen, pectin, alginic acid, glucomannan, chitin, hyaluronic acid, chondroitin, agarose, polyethers, and ethylene glycol, trivalent alcohols such as glycerin, and the like.

In the slurry preparation step, the central particle raw material and the organic compound are dissolved or dispersed in water, thereby preparing a homogeneous slurry.

When the central particle raw material and the organic compound are dissolved or dispersed in water, it is also possible to add a dispersant thereto. In addition, when the agglomeration degree of the central particles is adjusted at the same time, the strength (granulated body breakage degree) of the secondary particles is controlled.

Examples of a method for dissolving or dispersing the central particle raw material and the organic compound in water and adjusting the agglomeration degree of the central particles include a method in which a medium stirring-type dispersion device that stirs medium particles at a high rate such as a planetary ball mill, an oscillation ball mill, a bead mill, or a sand mill is used.

Here, examples of an index for controlling the agglomeration degree of the central particles include the ratio (median diameter (nm)/crystallite diameter (nm)) of the median diameter in the particle size distribution after a dispersion treatment using a medium stirring-type dispersion device to the crystallite diameter which is calculated from the crystallite diameters before the dispersion treatment. As the (median diameter (nm)/crystallite diameter (nm)) indicates a higher value, the agglomeration degree of the central particles increases, and the contact frequency between the active material particles in the secondary particles more significantly varies between a place with a high contact frequency and a place with a low contact frequency, and thus the strength of the secondary particles decreases, and the granulated body breakage degree indicates a higher value. On the other hand, as the (median diameter (nm)/crystallite diameter (nm)) indicates a lower value, the agglomeration degree of the central particles decreases, and the contact frequency between the active material particles in the secondary particles uniformly increases as a whole, and thus the strength of the secondary particles improves, and the granulated body breakage degree indicates a lower value. When the dispersion intensity of the medium stirring-type dispersion device is weak, the (median diameter (nm)/crystallite diameter (nm)) value increases, and, when the dispersion intensity of the medium stirring-type dispersion device is strong, the (median diameter (nm)/crystallite diameter (nm)) value decreases.

In addition, in order to control the agglomeration degree of the central particles and the (median diameter (nm)/crystallite diameter (nm)), the crystallite diameter of the active material particle before the dispersion treatment is preferably 30 nm or more and 300 nm or less and more preferably 80 nm or more and 130 nm or less. In the particle size distribution after the dispersion treatment using a medium stirring-type dispersion device, the median diameter is preferably 80 nm or more and 200 nm or less and more preferably 100 nm or more and 160 nm or less.

Calcination Step

Next, the slurry prepared in the slurry preparation step is sprayed and dried in a high-temperature atmosphere, for example, in the atmosphere of 70° C. or higher and 250° C. or lower.

Next, the obtained dried substance is calcinated in a non-oxidative atmosphere at a temperature of preferably 600° C. or higher and 1,000° C. or lower and more preferably 650° C. or higher and 840° C. or lower for 0.1 hours or longer and 40 hours or shorter.

The non-oxidative atmosphere is preferably an atmosphere filled with an inert gas such as nitrogen ($N_2$), argon (Ar), or the like. In a case in which it is necessary to further suppress the oxidation of the dried substance, a reducing atmosphere including approximately several percentages by volume of a reducing gas such as hydrogen ($H_2$) is preferred. In addition, for the purpose of removing organic components evaporated in the non-oxidative atmosphere during the calcination, a susceptible or burnable gas such as oxygen ($O_2$) may be introduced into the non-oxidative atmosphere.

Here, when the calcination temperature is set to 600° C. or higher, it is easy for the organic compound in the dried substance to be sufficiently decomposed and reacted, and the organic compound is easily and sufficiently carbonized. As a result, it is easy to prevent the generation of a high-resistance decomposed substance of the organic compound in the obtained agglomerates. In addition, when the calcination temperature is set to 650° C. or higher, during the calendering of an electrode for which a calcinated substance is used as the cathode active material particles, the porosity of the electrode does not excessively increase, and thus the electron migration resistance in the cathode mixture layer decreases, and the energy density improves. Meanwhile, when the calcination temperature is set to 1,000° C. or lower, lithium (Li) in the central particle raw material is not easily evaporated, and the particle growth of the central particles to a size that is equal to or larger than the target size is suppressed. As a result, in a case in which lithium-ion secondary batteries including a cathode including the cathode material for a lithium-ion secondary battery of the present embodiment are produced, it is possible to prevent the discharge capacity at a high charge-discharge rate from being decreased, and it is possible to realize lithium-ion secondary batteries having sufficient charge and discharge rate performance. In addition, when the calcination temperature is set to 840° C. or lower, during the pressurization of an electrode for which the calcinated substance is used as the cathode active material, the porosity of the electrode does not excessively increase, and thus it becomes possible to suppress the deterioration of the durability caused by the change in the electrode structure arising from the expansion and shrinkage of the cathode active material during a charging and discharging cycle.

By means of the above-described steps, secondary particles obtained by granulating active material particles in which the surfaces of the primary particles of the central particles are coated with a pyrolytic carbonaceous film generated by the thermal decomposition of the organic compound in the dried substance are obtained.

Cathode for Lithium-Ion Secondary Battery

A cathode for a lithium-ion secondary battery of the present embodiment includes secondary particles obtained by granulating active material particles having central particles represented by General Formula $Li_xFe_yM_zPO_4$ (here, M represents at least one element selected from the group consisting of Mg, Ca, Co, Sr, Ba, Ti, Zn, B, Al, Ga, In, Si, Ge, and rare earth elements, $0.95 \leq x \leq 1.10$, $0.80 \leq y \leq 1.10$, and $0.00 \leq z \leq 0.20$) and a carbonaceous film that coats the surfaces of the central particles.

The cathode for a lithium-ion secondary battery of the present embodiment includes an electrode current collector made of a metal foil and a cathode mixture layer formed on the electrode current collector, and the cathode mixture layer includes the cathode material for a lithium-ion secondary battery of the present embodiment. The cathode for a lithium-ion secondary battery of the present embodiment is a cathode obtained by forming the cathode mixture layer on one main surface of the electrode current collector using the cathode material for a lithium-ion secondary battery of the present embodiment.

Since the cathode for a lithium-ion secondary battery of the present embodiment includes the cathode material for a lithium-ion secondary battery of the present embodiment, lithium-ion secondary batteries for which the cathode for a lithium-ion secondary battery of the present embodiment is used have excellent rate characteristics.

Method for Manufacturing Cathode for Lithium-Ion Secondary Battery

A method for manufacturing the cathode for a lithium-ion secondary battery of the present embodiment is not particularly limited as long as the cathode mixture layer can be formed on one main surface of the electrode current collector using the cathode material for a lithium-ion secondary battery of the present embodiment. Examples of the method for manufacturing the cathode for a lithium-ion secondary battery of the present embodiment include the following method.

First, the cathode material for a lithium-ion secondary battery of the present embodiment, a binder made of a binder resin, and a solvent are mixed together, thereby preparing cathode material paste. At this time, to the cathode material paste in the present embodiment, a conductive auxiliary agent such as carbon black may be added if necessary.

Binder

As the binder, that is, the binder resin, for example, a polytetrafluoroethylene (PTFE) resin, a polyvinylidene fluoride (PVdF) resin, fluorine rubber, or the like is preferably used.

The blending amount of the binder used to prepare the cathode material paste is not particularly limited, but is, for example, preferably 1 part by mass or more and 30 parts by mass or less and more preferably 3 parts by mass or more and 20 parts by mass or less with respect to 100 parts by mass of the cathode material for a lithium-ion secondary battery.

When the blending amount of the binder is 1 part by mass or more, it is possible to sufficiently improve the binding property between the cathode mixture layer and the electrode current collector. Therefore, it is possible to prevent the cathode mixture layer from being cracked or dropped during the formation of the cathode mixture layer by means of rolling or the like. In addition, it is possible to prevent the cathode mixture layer from being peeled off from the electrode current collector in processes of charging and discharging lithium-ion secondary batteries and prevent the battery capacity or the charge-discharge rate from being decreased. Meanwhile, when the blending amount of the binder is 30 parts by mass or less, it is possible to prevent the internal resistance of the cathode material for a lithium-ion secondary battery from being decreased and prevent the battery capacity at a high charge-discharge rate from being decreased.

Conductive Auxiliary Agent

The conductive auxiliary agent is not particularly limited, and, for example, at least one element selected from the group consisting of particulate carbon such as acetylene black (AB), KETJEN BLACK, and furnace black and fibrous carbon such as vapor-grown carbon fiber (VGCF) and carbon nanotube is used.

Solvent

The solvent that is used in the cathode material paste including the cathode material for a lithium-ion secondary battery of the present embodiment is appropriately selected depending on the properties of the binder. When the solvent is appropriately selected, it is possible to facilitate the application of the cathode material paste to substances to be coated such as the electrode current collector.

Examples of the solvent include water, alcohols such as methanol, ethanol, 1-propanol, 2-propanol (isopropyl alcohol: IPA), butanol, pentanol, hexanol, octanol, and diacetone alcohol, esters such as ethyl acetate, butyl acetate, ethyl lactate, propylene glycol monomethyl ether acetate, propylene glycol monoethyl ether acetate, and γ-butyrolactone, ethers such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether, and diehtylene glycol monoethyl ether, ketones such as acetone, methyl ethyl ketone (MEK), methyl isobutyl ketone (MIBK), acetylacetone, and cyclohexanone, amides such as dimethyl formamide, N,N-dimethylacetoacetamide, and N-methyl-2-pyrrolidinone (NMP),glycolssuchasethyleneglycol, diethylene glycol, and propylene glycol, and the like. These solvents may be used singly or in a mixture form of two or more solvents.

The content rate of the solvent in the cathode material paste is preferably 50% by mass or more and 70% by mass or less and more preferably 55% by mass or more and 65% by mass or less in a case in which the total mass of the cathode material for a lithium-ion secondary battery of the present embodiment, the binder, and the solvent is set to 100% by mass.

When the content rate of the solvent in the cathode material paste is in the above-described range, it is possible to obtain cathode material paste having excellent cathode formability and excellent battery characteristics.

A method for mixing the cathode material for a lithium-ion secondary battery of the present embodiment, the binder, the conductive auxiliary agent, and the solvent is not particularly limited as long as these components can be uniformly mixed together. Examples thereof include mixing methods in which a kneader such as a ball mill, a sand mill, a planetary mixer, a paint shaker, or a homogenizer is used.

The cathode material paste is applied to one main surface of the electrode current collector so as to form a coated film, and then this coated film is dried, thereby obtaining an electrode current collector having a coated film made of the mixture of the cathode material and the binder formed on one main surface.

After that, the coated film is pressed by pressure and is dried, thereby obtaining a cathode having the cathode mixture layer on one main surface of the electrode current collector.

Lithium-Ion Secondary Battery

A lithium-ion secondary battery of the present embodiment includes a cathode, an anode, and a non-aqueous electrolyte, in which the cathode is the cathode for a lithium-ion secondary battery of the present embodiment. Specifically, the lithium-ion secondary battery of the present embodiment includes the cathode for a lithium-ion secondary battery of the present embodiment as a cathode, an anode, a separator, and a non-aqueous electrolyte.

In the lithium-ion secondary battery of the present embodiment, the anode, the non-aqueous electrolyte, and the separator are not particularly limited.

Anode

Examples of the anode include anodes including an anode material such as Li metal, carbon materials such as natural graphite and hard carbon, Li alloys, $Li_4Ti_5O_{12}$, $Si(Li_{4.4}Si)$, and the like.

Non-Aqueous Electrolyte

Examples of the non-aqueous electrolyte include non-aqueous electrolytes obtained by mixing ethylene carbonate (EC) and ethyl methyl carbonate (EMC) so that the volume ratio reaches 1:1 and dissolving lithium hexafluorophosphate ($LiPF_6$) in the obtained solvent mixture so that the concentration reaches 1 mol/dm$^3$.

Separator

As the separator, it is possible to use, for example, porous propylene.

In addition, instead of the non-aqueous electrolyte and the separator, a solid electrolyte may be used.

Since the lithium-ion secondary battery of the present embodiment includes the cathode for a lithium-ion secondary battery of the present embodiment as the cathode, the lithium-ion secondary battery has a high energy density and has excellent input and output characteristics.

EXAMPLES

Hereinafter, the present invention will be more specifically described using examples and comparative examples, but the present invention is not limited to the following examples.

Example 1

Synthesis of Cathode Material for Lithium-Ion Secondary Battery

Lithium phosphate ($Li_3PO_4$) (2 mol) and iron (II) sulfate ($FeSO_4$) (2 mol) were added to and mixed with water so that the total amount reached 4 L, thereby preparing a homogeneous slurry-form mixture.

Next, this mixture was stored in a pressure-resistant airtight container having a capacity of 8 L and was hydrothermally synthesized at 200° C. for six hours, thereby generating a precipitate of a cathode active material.

Next, this precipitate was cleaned with water, thereby obtaining a cake-form cathode active material.

Next, a polyethylene glycol (4.5 g) as an organic compound and pure water were added to this cathode active material (150 g in terms of solid content), and a dispersion treatment was carried out on the mixture using zirconia balls having a diameter of 0.1 mm as medium particles in a sand mill. At this time, the amount of the pure water was adjusted so that the proportion of the mass of the cathode active material as the numerator in the mass of the slurry as the denominator reached 0.5. In addition, the median diameter in the particle size distribution of the dispersed slurry after the sand milling was adjusted to 135 nm, and a point in time at which the median diameter (nm)/crystallite diameter (nm) which was calculated from the crystallite diameter before the sand milling of 123 nm reached 1.10 was considered as the ending point of the sand milling.

Next, this slurry was sprayed and dried in the atmosphere at 170° C., thereby obtaining granulated bodies of a cathode material which were coated with an organic substance.

Next, the obtained granulated body was calcinated at 700° C. for 1.5 hours in a nitrogen atmosphere, thereby obtaining a cathode material 1 of the granulated bodies coated with a carbonaceous film.

Production of Lithium-Ion Secondary Battery

The cathode material 1, polyvinylidene fluoride (PVdF) as a binder, and acetylene black (AB) as a conductive auxiliary agent were mixed into N-methyl-2-pyrrolidinone (NMP) which was a solvent so that the mass ratio (the cathode material 1:AB:PVdF) in paste reached 94.5:0.5:5, and the components were kneaded using a kneader (manufactured by Primix Corporation, trade name: FILMIX) for one minute under a conditions of 35 m/sec, thereby preparing cathode material paste (for the cathode).

This cathode material paste (for the cathode) was applied onto the surface of a 30 μm-thick aluminum foil (electrode current collector) so as to form a coated film, and the coated film was dried, thereby forming a cathode mixture layer on the surface of the aluminum foil. The amount of the cathode mixture layer was adjusted so that the capacity density reached 2.8 mAh/cm$^2$ in the case of computation with the theoretical capacity of lithium iron phosphate set to 170 mAh/g.

After that, the cathode mixture layer was pressurized until the thickness reached 90 μm, thereby producing a cathode 1 of Example 1.

A lithium metal was disposed as an anode with respect to this cathode 1, and a separator made of porous polypropylene was disposed between the cathode 1 and the anode, thereby producing a member for a battery 1.

Meanwhile, ethylene carbonate and diethyl carbonate were mixed together in a mass ratio of 1:1 (mass ratio), and furthermore, 1 mol/L of a $LiPF_6$ solution was added thereto, thereby producing an electrolyte solution 1 having lithium ion conductivity.

Next, the member for a battery 1 was immersed in the electrolyte solution 1, thereby producing a lithium-ion secondary battery 1 of Example 1.

Example 2

A cathode material 2 of Example 2 was obtained in the same manner as in Example 1 except for the fact that the median diameter in the particle size distribution of the dispersed slurry after the sand milling was adjusted to 131 nm, and a point in time at which the median diameter (nm)/crystallite diameter (nm) which was calculated from the crystallite diameter before the sand milling of 123 nm reached 1.07 was considered as the ending point of the sand milling.

A lithium-ion secondary battery 2 of Example 2 was produced in the same manner as in Example 1 except for the fact that the cathode material 2 was used.

Example 3

A cathode material 3 of Example 3 was obtained in the same manner as in Example 1 except for the fact that the median diameter in the particle size distribution of the dispersed slurry after the sand milling was adjusted to 127 nm, and a point in time at which the median diameter (nm)/crystallite diameter (nm) which was calculated from the crystallite diameter before the sand milling of 123 nm reached 1.03 was considered as the ending point of the sand milling.

A lithium-ion secondary battery 3 of Example 3 was produced in the same manner as in Example 1 except for the fact that the cathode material 3 was used.

Example 4

A cathode material 4 of Example 4 was obtained in the same manner as in Example 1 except for the fact that the median diameter in the particle size distribution of the dispersed slurry after the sand milling was adjusted to 124 nm, and a point in time at which the median diameter (nm)/crystallite diameter (nm) which was calculated from the crystallite diameter before the sand milling of 123 nm reached 1.01 was considered as the ending point of the sand milling.

A lithium-ion secondary battery 4 of Example 4 was produced in the same manner as in Example 1 except for the fact that the cathode material 4 was used.

Example 5

Lithium phosphate ($Li_3PO_4$) (2 mol) and iron (II) sulfate ($FeSO_4$) (2 mol) were added to and mixed with water so that the total amount reached 4 L, thereby preparing a homogeneous slurry-form mixture.

Next, this mixture was stored in a pressure-resistant airtight container having a capacity of 8 L and was hydrothermally synthesized at 180° C. for three hours, thereby generating a precipitate of a cathode active material.

Next, this precipitate was cleaned with water, thereby obtaining a cake-form cathode active material.

Next, a polyethylene glycol (4.5 g) as an organic compound and pure water were added to this cathode active material (150 g in terms of solid content), and a dispersion treatment was carried out on the mixture using zirconia balls having a diameter of 0.1 mm as medium particles in a sand mill. At this time, the amount of the pure water was adjusted so that the proportion of the mass of the cathode active material as the numerator in the mass of the slurry as the denominator reached 0.5. In addition, the median diameter in the particle size distribution of the dispersed slurry after the sand milling was adjusted to 125 nm, and a point in time at which the median diameter (nm)/crystallite diameter (nm) which was calculated from the crystallite diameter before the sand milling of 105 nm reached 1.19 was considered as the ending point of the sand milling.

Next, this slurry was sprayed and dried in the atmosphere at 170° C., thereby obtaining granulated bodies of a cathode material which were coated with an organic substance.

Next, the obtained granulated bodies were calcinated at 700° C. for 1.5 hours in a nitrogen atmosphere, thereby obtaining a cathode material 5 of the granulated bodies coated with a carbonaceous film.

A lithium-ion secondary battery 5 of Example 5 was produced in the same manner as in Example 1 except for the fact that the cathode material 5 was used.

Example 6

A cathode material 6 of Example 6 was obtained in the same manner as in Example 1 except for the fact that the median diameter in the particle size distribution of the dispersed slurry after the sand milling was adjusted to 114 nm, and a point in time at which the median diameter (nm)/crystallite diameter (nm) which was calculated from the crystallite diameter before the sand milling of 105 nm reached 1.09 was considered as the ending point of the sand milling.

A lithium-ion secondary battery 6 of Example 6 was produced in the same manner as in Example 1 except for the fact that the cathode material 6 was used.

Example 7

A cathode material 7 of Example 7 was obtained in the same manner as in Example 1 except for the fact that the median diameter in the particle size distribution of the dispersed slurry after the sand milling was adjusted to 109 nm, and a point in time at which the median diameter (nm)/crystallite diameter (nm) which was calculated from the crystallite diameter before the sand milling of 105 nm reached 1.04 was considered as the ending point of the sand milling.

A lithium-ion secondary battery 7 of Example 7 was produced in the same manner as in Example 1 except for the fact that the cathode material 7 was used.

Example 8

A cathode material 8 of Example 8 was obtained in the same manner as in Example 1 except for the fact that the median diameter in the particle size distribution of the dispersed slurry after the sand milling was adjusted to 107 nm, and a point in time at which the median diameter (nm)/crystallite diameter (nm) which was calculated from the crystallite diameter before the sand milling of 105 nm reached 1.02 was considered as the ending point of the sand milling.

A lithium-ion secondary battery 8 of Example 8 was produced in the same manner as in Example 1 except for the fact that the cathode material 8 was used.

Example 9

Synthesis of Cathode Material for Lithium-Ion Secondary Battery

Lithium phosphate ($Li_3PO_4$) (2 mol) and iron (II) sulfate ($FeSO_4$) (2 mol) were added to and mixed with water so that the total amount reached 4 L, thereby preparing a homogeneous slurry-form mixture.

Next, this mixture was stored in a pressure-resistant airtight container having a capacity of 8 L and was hydrothermally synthesized at 150° C. for one hour, thereby generating a precipitate of a cathode active material.

Next, this precipitate was cleaned with water, thereby obtaining a cake-form cathode active material.

Next, a polyethylene glycol (4.5 g) as an organic compound and pure water were added to this cathode active material (150 g in terms of solid content), and a dispersion treatment was carried out on the mixture using zirconia balls having a diameter of 0.1 mm as medium particles in a sand mill. At this time, the amount of the pure water was adjusted so that the proportion of the mass of the cathode active material as the numerator in the mass of the slurry as the denominator reached 0.5. In addition, the median diameter in the particle size distribution of the dispersed slurry after the sand milling was adjusted to 171 nm, and a point in time at which the median diameter (nm)/crystallite diameter (nm) which was calculated from the crystallite diameter before the sand milling of 82 nm reached 2.09 was considered as the ending point of the sand milling.

Next, this slurry was sprayed and dried in the atmosphere at 170° C., thereby obtaining granulated bodies of a cathode material which were coated with an organic substance.

Next, the obtained granulated bodies were calcinated at 700° C. for 1.5 hours in a nitrogen atmosphere, thereby obtaining a cathode material 9 of the granulated bodies coated with a carbonaceous film.

A lithium-ion secondary battery 9 of Example 9 was produced in the same manner as in Example 1 except for the fact that the cathode material 9 was used.

Example 10

A cathode material 10 of Example 10 was obtained in the same manner as in Example 9 except for the fact that the median diameter in the particle size distribution of the dispersed slurry after the sand milling was adjusted to 118 nm, and a point in time at which the median diameter (nm)/crystallite diameter (nm) which was calculated from the crystallite diameter before the sand milling of 82 nm reached 1.44 was considered as the ending point of the sand milling.

A lithium-ion secondary battery 10 of Example 10 was produced in the same manner as in Example 9 except for the fact that the cathode material 10 was used.

Example 11

A cathode material 11 of Example 11 was obtained in the same manner as in Example 9 except for the fact that the median diameter in the particle size distribution of the dispersed slurry after the sand milling was adjusted to 101 nm, and a point in time at which the median diameter (nm)/crystallite diameter (nm) which was calculated from the crystallite diameter before the sand milling of 82 nm reached 1.23 was considered as the ending point of the sand milling.

A lithium-ion secondary battery 11 of Example 11 was produced in the same manner as in Example 9 except for the fact that the cathode material 11 was used.

Comparative Example 1

A cathode material 21 of Comparative Example 1 was obtained in the same manner as in Example 1 except for the fact the median diameter in the particle size distribution of the dispersed slurry after the sand milling was adjusted to 243 nm, and a point in time at which the median diameter (nm)/crystallite diameter (nm) which was calculated from the crystallite diameter before the sand milling of 123 nm reached 1.98 was considered as the ending point of the sand milling.

A lithium-ion secondary battery 21 of Comparative Example 1 was produced in the same manner as in Example 1 except for the fact that the cathode material 21 was used.

Comparative Example 2

A cathode material 22 of Comparative Example 2 was obtained in the same manner as in Example 1 except for the fact that the median diameter in the particle size distribution of the dispersed slurry after the sand milling was adjusted to 162 nm, and a point in time at which the median diameter (nm)/crystallite diameter (nm) which was calculated from the crystallite diameter before the sand milling of 123 nm reached 1.32 was considered as the ending point of the sand milling.

A lithium-ion secondary battery 22 of Comparative Example 2 was produced in the same manner as in Example 1 except for the fact that the cathode material 22 was used.

Comparative Example 3

A cathode material 23 of Comparative Example 3 was obtained in the same manner as in Example 5 except for the fact that the median diameter in the particle size distribution of the dispersed slurry after the sand milling was adjusted to 264 nm, and a point in time at which the median diameter (nm)/crystallite diameter (nm) which was calculated from the crystallite diameter before the sand milling of 105 nm reached 2.51 was considered as the ending point of the sand milling.

A lithium-ion secondary battery 23 of Comparative Example 3 was produced in the same manner as in Example 1 except for the fact that the cathode material 23 was used.

Comparative Example 4

A cathode material 24 of Comparative Example 4 was obtained in the same manner as in Example 9 except for the fact that the median diameter in the particle size distribution of the dispersed slurry after the sand milling was adjusted to 301 nm, and a point in time at which the median diameter (nm)/crystallite diameter (nm) which was calculated from the crystallite diameter before the sand milling of 82 nm reached 3.67 was considered as the ending point of the sand milling.

A lithium-ion secondary battery 24 of Comparative Example 4 was produced in the same manner as in Example 9 except for the fact that the cathode material 24 was used.

Comparative Example 5

A cathode material 25 of Comparative Example 5 was obtained in the same manner as in Example 9 except for the fact that the median diameter in the particle size distribution of the dispersed slurry after the sand milling was adjusted to 93 nm, and a point in time at which the median diameter (nm)/crystallite diameter (nm) which was calculated from the crystallite diameter before the sand milling of 82 nm reached 1.13 was considered as the ending point of the sand milling.

A lithium-ion secondary battery 25 of Comparative Example 5 was produced in the same manner as in Example 9 except for the fact that the cathode material 25 was used.

Comparative Example 6

A cathode material 26 of Comparative Example 6 was obtained in the same manner as in Example 9 except for the fact that the median diameter in the particle size distribution of the dispersed slurry after the sand milling was adjusted to 91 nm, and a point in time at which the median diameter (nm)/crystallite diameter (nm) which was calculated from the crystallite diameter before the sand milling of 82 nm reached 1.11 was considered as the ending point of the sand milling.

A lithium-ion secondary battery 26 of Comparative Example 6 was produced in the same manner as in Example 9 except for the fact that the cathode material 26 was used.

Evaluation of Cathode Material for Lithium-Ion Secondary Battery and Lithium-Ion Secondary Battery The cathode active materials, the slurries after the sand milling, the cathode materials for a lithium-ion secondary battery and the lithium-ion secondary batteries of Example 1 to Example 12 and Comparative Example 1 to Comparative Example 6 were evaluated as described below.

1. Crystallite Diameter Before Sand Milling

The crystallite diameter before the sand milling was measured using the following method.

First, the cathode active material obtained by cleaning the precipitate after the hydrothermal treatment with water was dried at 120° C. in the atmosphere, this dried substance was crushed using a mortar and packed into a specimen holder for XRD measurement, and an XRD measurement was carried out using a measurement instrument (trade name: X'pertMPD, manufactured by PANalytical Ltd.). The XRD measurement conditions are as described below.

XRD Measurement Conditions
Radiation source: Cu-Kα
Step size: 0.01°/step
Scanning speed: 3 seconds/step In the obtained XRD diffraction pattern, the crystallite diameter was calculated from the full width at half maximum (B) of a peak having a 2θ in a range of 28.8° to 30.8°. The calculation expression of the crystallite diameter is as described below.

Crystallite Diameter Calculation Expression $$\text{Crystallite diameter (nm)} = \{0.9 \times 1.5418 \times 0.1\}/\{\beta(\text{Å}) \times \cos(29.78/2 \times \pi/2)\}$$

$$\beta^2 = (B^2 - b^2)$$

b: Full width at half maximum of standard specimen Si) (2θ=47.3°)

2. Crystallite Diameter After Sand Milling

The particle size distribution of the dispersed slurry after the sand milling was measured using the following method.

The crystallite diameter was measured using a measurement instrument (trade name: LA-950V2, manufactured by Horiba Ltd.).

The particle size distribution was measured using the slurry after the sand mill dispersion treatment. For the slurry after the sand mill dispersion treatment, the measurement was carried out with the data loading number set to 5,000 for a semiconductor laser (LD) and 1,000 for a light-emitting diode (LED), and the data computation conditions were as described below.

Computation Conditions
(Sample Refractive Index)
LD real part: 1.70
LD imaginary part: 0.20
LED real part: 1.70
LED imaginary part: 0.20
(Dispersion Medium Refractive Index)
LD real part: 1.33
LD imaginary part: 0.00
LED real part: 1.33
LED imaginary part: 0.00
(Number of repetitions): 15 times
(Particle diameter criterion): Volume
(Computation algorithm): Standard volume 3. Granulated Body Breakage Degree The granulated body breakage degree in the cathode material for a lithium-ion secondary battery is calculated from the following expression using the relative particle amount a with the maximum peak in the particle size distribution of the secondary particles and the relative particle amount b with the maximum peak in the particle size distribution measured after a dispersion treatment of the secondary particles using a homogenizer.

$$\text{Granulated body breakage degree} = (\text{relative particle amount } a - \text{relative particle amount } b)/\text{relative particle amount } a$$

The relative particle amount a and the relative particle amount b were measured using the following method.

i. Relative Particle Amount a

The cathode material for a lithium-ion secondary battery (0.1 g) and pure water (40 g) were put into a 75 ml plastic container, the lid was closed, and the container was shaken 10 times, thereby preparing a solution mixture.

Next, the particle size distribution of the secondary particles was measured using this solution mixture. The relative particle amount with the maximum peak in the obtained particle size distribution of the secondary particles was considered as the relative particle amount a.

ii. Relative Particle Amount b

The cathode material for a lithium-ion secondary battery (47 g), pure water (47 g), and polyvinyl pyrrolidone (PVP) (0.47 g) were put into a 75 ml plastic container, the lid was closed, the container was shaken 30 times, and then a dispersion treatment was carried out on this slurry.

The dispersion treatment was carried out using a homogenizer (main body trade name: T25 digital ULTRA-TURRAX, shaft generator, trade name: S25N-18G, manufactured by IKA) at a rotation speed of 8,500 rpm and a treatment time of four minutes.

The particle size distribution of the secondary particles was measured using a slurry after this homogenizer treatment.

Here, the relative particle amount (%) in which the secondary particle diameters were in a range of 1.0 μm or more and 45.0 μm or less was considered as the relative particle amount b with the maximum peak.

The particle size distribution of the secondary particles which was used to calculate the relative particle amount a and the relative particle amount b was measured using a measurement instrument (trade name: LA-950V2, manufactured by Horiba Ltd.). The particle size distribution was measured with the data loading number set to 5,000 for a semiconductor laser (LD) and 1,000 for a light-emitting diode (LED), and the data computation conditions were as described below.

Figure 1:
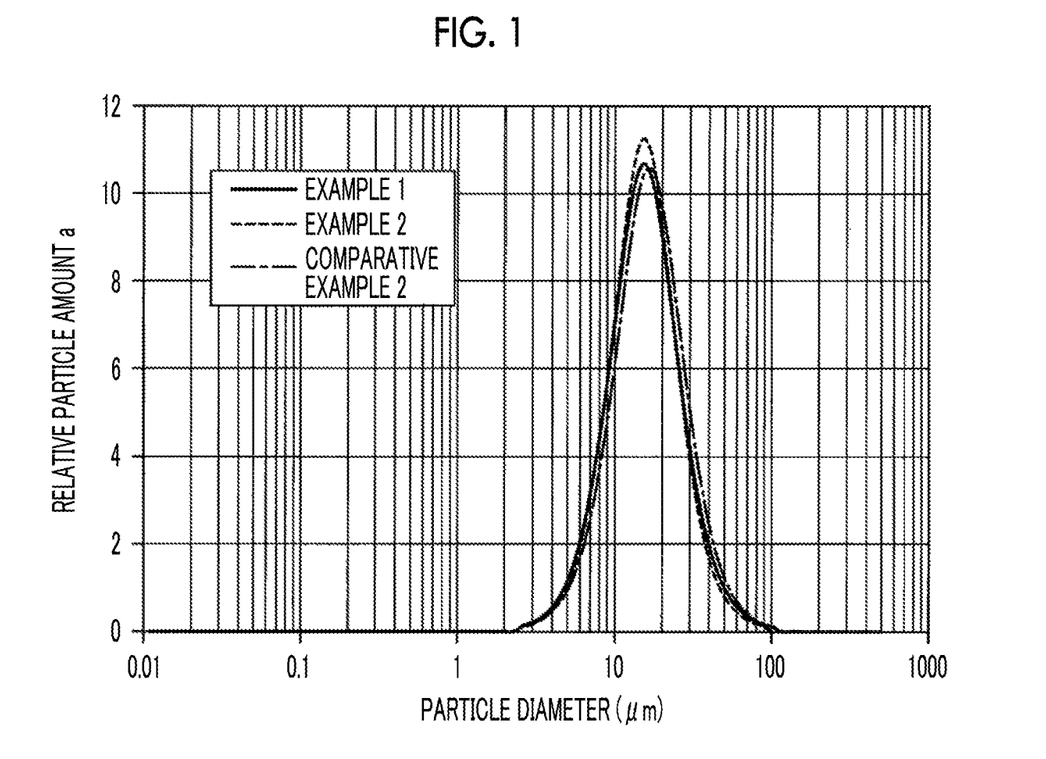
FIG. 1 is a particle size distribution map of cathode materials for a lithium-ion secondary battery in examples and a comparative example.
Figure 2:
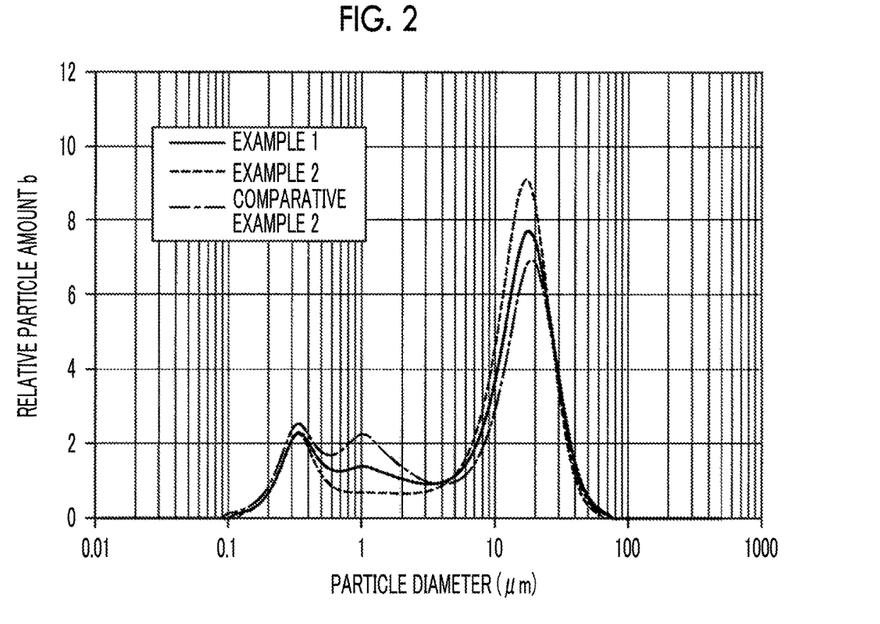
FIG. 2 is a particle size distribution map measured after a dispersion treatment of the cathode materials for a lithium-ion secondary battery using a homogenizer in the examples and the comparative example.

Computation Conditions
LD real part: 1.70
LD imaginary part: 0.20
LED real part: 1.70
LED imaginary part: 0.20
Dispersion Medium Refractive Index
LD real part: 1.33
LD imaginary part: 0.00
LED real part: 1.33
LED imaginary part: 0.00
(Number of repetitions): 15 times
(Particle diameter criterion): Volume
(Computation algorithm): Standard volume The measurement results of the particle size distribution which was used to calculate the relative particle amount a and the relative particle amount b are outputted as illustrated in FIG. 1 or FIG. 2.

4. BET Specific Surface Area

The BET specific surface area of the cathode material for a lithium-ion secondary battery was measured using a measurement device (trade name: HM model-1208, manufactured by Mountech Co., Ltd.) and a one-point method at a relative pressure of 0.29 ($P/P_0$).

5. Amount of Carbon

The amount of carbon in the cathode material for a lithium-ion secondary battery was measured using a carbon/sulfur analyzer (trade name: EMIA-220V, manufactured by Horiba Ltd.).

6. 5C Discharge Capacity After 200 Cycles

The 5C discharge capacity of the lithium-ion secondary battery after 200 cycles was measured using the following method.

First, constant-current charging was carried out at a current value of 2.0 C until the battery voltage reached 3.7 V, and then discharging was carried out at a current value of 2.0 C until the battery voltage reached 2.5 V in an environment of 25° C. in one cycle, and this cycle was repeated 200 times.

Next, constant-current charging was carried out at a current value of 0.5 C until the battery voltage reached 3.7 V, then, discharging was carried out at a current value of 5.0 C until the battery voltage reached 2.5 V in an environment of 25° C., and the discharge capacity at this time was considered as the 5 C discharge capacity after 200 cycles.

In addition, in a case in which the 5 C discharge capacity after 200 cycles was 70 mAh/g or more, the rate characteristics were evaluated as ○, and, in a case in which the 5 C discharge capacity after 200 cycles was less than 70 mAh/g, the rate characteristics were evaluated as X.

Evaluation Results

The evaluation results of the cathode materials for a lithium-ion secondary battery and the lithium-ion secondary batteries of Example 1 to Example 11 and the cathode materials for a lithium-ion secondary battery and the lithium-ion secondary batteries of Comparative Example 1 to Comparative Example 6 are shown in Table 1.

In addition, the particle size distribution map of the cathode materials for a lithium-ion secondary battery in Example 1, Example 2, and Comparative Example 2 is illustrated in FIG. 1, and the particle size distribution map measured after a dispersion treatment of the cathode materials for a lithium-ion secondary battery in Example 1, Example 2, and Comparative Example 2 using a homogenizer is illustrated in FIG. 2.

TABLE 1

|  | Median diameter (after sand milling) [nm] | Crystallite diameter (before sand milling) [nm] | Median diameter/crystallite diameter (sand milling dispersion ending point) | BET specific surface area [$m^2$/g] | C amount [parts by mass] | Relative particle amount a | Relative particle amount b | Granulated body breakage degree (a − b/a) | 5 C discharge capacity after 200 cycles [mAh/g] |
|---|---|---|---|---|---|---|---|---|---|
| Example 1 | 135 | 123 | 1.10 | 6.6 | 0.83 | 10.69 | 7.69 | 0.280 | 72 |
| Example 2 | 131 | 123 | 1.07 | 6.8 | 0.87 | 10.86 | 8.09 | 0.255 | 78 |
| Example 3 | 127 | 123 | 1.03 | 6.9 | 0.91 | 11.27 | 9.11 | 0.191 | 81 |
| Example 4 | 124 | 123 | 1.01 | 7.0 | 0.93 | 10.37 | 8.43 | 0.187 | 80 |
| Example 5 | 125 | 105 | 1.19 | 8.9 | 1.11 | 11.10 | 8.97 | 0.192 | 87 |
| Example 6 | 114 | 105 | 1.09 | 9.0 | 1.14 | 10.67 | 9.32 | 0.127 | 89 |
| Example 7 | 109 | 105 | 1.04 | 9.1 | 1.17 | 10.28 | 9.22 | 0.103 | 92 |
| Example 8 | 107 | 105 | 1.02 | 9.3 | 1.19 | 10.67 | 9.56 | 0.104 | 92 |
| Example 9 | 171 | 82 | 2.09 | 12.7 | 1.25 | 10.13 | 8.52 | 0.159 | 98 |
| Example 10 | 118 | 82 | 1.44 | 12.9 | 1.29 | 9.87 | 8.99 | 0.089 | 92 |
| Example 11 | 101 | 82 | 1.23 | 13.1 | 1.29 | 10.54 | 9.87 | 0.064 | 84 |
| Comparative Example 1 | 243 | 123 | 1.98 | 6.2 | 0.76 | 11.79 | 6.43 | 0.455 | 9 |
| Comparative Example 2 | 162 | 123 | 1.32 | 6.5 | 0.81 | 10.43 | 6.86 | 0.342 | 38 |
| Comparative Example 3 | 264 | 105 | 2.51 | 8.3 | 0.99 | 10.23 | 6.42 | 0.372 | 27 |
| Comparative Example 4 | 301 | 82 | 3.67 | 11.8 | 1.12 | 10.23 | 7.11 | 0.305 | 53 |

TABLE 1-continued

|  | Median diameter (after sand milling) [nm] | Crystallite diameter (before sand milling) [nm] | Median diameter/crystallite diameter (sand milling dispersion ending point) | BET specific surface area [m²/g] | C amount [parts by mass] | Relative particle amount a | Relative particle amount b | Granulated body breakage degree (a − b/a) | 5 C discharge capacity after 200 cycles [mAh/g] |
|---|---|---|---|---|---|---|---|---|---|
| Comparative Example 5 | 93 | 82 | 1.13 | 13.4 | 1.31 | 9.79 | 9.54 | 0.026 | 65 |
| Comparative Example 6 | 91 | 82 | 1.11 | 13.6 | 1.33 | 9.67 | 9.43 | 0.025 | 51 |

When Example 1 to Example 11 and Comparative Example 1 to Comparative Example 6 are compared with each other from the results in Table 1, it was found that, in Comparative Example 1 to Comparative Example 6 in which the granulated body breakage degree ((a–b)/a) was greater than 0.30 and less than 0.03, the 5 C discharge capacity after 200 cycles was less than 70 mAh/g, and the rate characteristics were poor. Regarding Comparative Example 1 to Comparative Example 4, it is considered to be because the granulated bodies were easily breakable, and thus the granulated bodies excessively broke during the kneading using the kneader, and consequently, the electron conductivity degraded. In addition, regarding Comparative Example 5 and Comparative Example 6, it is considered to be because the granulated bodies seldom broke, and thus the contact frequencies with the electrode current collector decreased, and the electron conductivity between the electrode current collector and the active material particles degraded.

On the other hand, it was found that, in Example 1 to Example 11 in which the granulated body breakage degree ((a–b)/a) was 0.30 or less and 0.03 or more, the 5 C discharge capacity after 200 cycles was 70 mAh/g or more, and the rate characteristics were excellent. This is considered to be because the breakage frequency of the granulated bodies during the kneading using the kneader was lower compared with those in Comparative Example 1 to Comparative Example 4, and it was possible to suppress the degradation of the electron conductivity caused by the breakage of the granulated bodies and because the breakage speed of the granulated bodies during the kneading using the kneader was faster than those in Comparative Example 5 and Comparative Example 6, and it was possible to suppress a decrease in the contact frequency between the current collector and the active material particles.

Lithium-ion secondary batteries for which the cathode material for a lithium-ion secondary battery of the present invention is used have an excellent energy density and durability and are thus capable of significantly contributing to the advancement of the reliability of lithium-ion secondary batteries including mobile body uses.

What is claimed is:

1. A cathode material for a lithium-ion secondary battery, the cathode material comprising:
    secondary particles which are granulated active material particles including central particles and a carbonaceous film that coats surfaces of the central particles, wherein
    a granulated body breakage degree ((a–b)/a) is 0.03 or more and 0.30 or less,
    the granulated body breakage degree is calculated based on a relative particle amount a, at which a maximum peak is shown in a particle size distribution of the secondary particles, and a relative particle amount b, at which a maximum peak in a particle size distribution of the secondary particles is shown after a dispersion treatment of the secondary particles is performed using a homogenizer, and
    the central particles are represented by general formula $Li_xFe_yM_zPO_4$ (here, M represents at least one element selected from the group consisting of Mg, Ca, Co, Sr, Ba, Ti, Zn, B, Al, Ga, In, Si, Ge, and rare earth elements, $0.95 \leq x \leq 1.10$, $0.80 \leq y \leq 1.10$, and $0.00 \leq z \leq 0.20$ and wherein the cathode material includes 5 m²/g or more and 13.1 m²/g or less of BET specific surface area and wherein the micropore diameter of the secondary particle is 80 nm or more and 1,000 nm or less, wherein the dispersion treatment of the secondary particles is performed using the homogenizer at a rotation speed of 8,500 rpm and a treatment time of four minutes, and wherein 5C discharge capacity after 200 cycles is 72 to 98 mAh/g, when the cathode material is used in the lithium secondary battery.

2. The cathode material for a lithium-ion secondary battery according to claim 1,
    wherein the central particles are $LiFePO_4$.

3. The cathode material for a lithium-ion secondary battery according to claim 1,
    wherein the particle size distribution of the secondary particles has a maximum peak in a range of 1.0 μm or more and 45.0 μm or less.

4. The cathode material for a lithium-ion secondary battery according to claim 1,
    wherein the granulated body breakage degree ((a–b)/a) is 0.07 or more and 0.25 or less.

5. The cathode material for a lithium-ion secondary battery according to claim 1, wherein the secondary particles are particles generated by the method comprising:
    manufacturing central particles and/or a precursor of the central particles;
    preparing a slurry by dissolving or dispersing an organic compound and at least one central particle raw material, which is selected from the group consisting of the central particles and the precursor of the central particles, in water; and
    drying the slurry by spraying the slurry in an atmosphere of 70° C. to 250° C. to generate dried substance and calcinating the obtained dried substance in a non-oxidative atmosphere,
    wherein, in the preparing of the slurry, a median diameter of the central particles in a particle size distribution, which is evaluated after dispersion treatment in the preparing the slurry, is adjusted to 100 nm or more and 160 nm or less, and a ratio (median diameter/crystallite diameter) of the median diameter to a crystallite diameter, which is calculated from crystallite diameters of the central particles before the dispersion treatment, is adjusted to 1.00 or more and 2.10 or less.

6. The cathode material for a lithium-ion secondary battery according to claim 5, wherein the crystallite diameter is 82 to 123 nm.

7. A cathode for a lithium-ion secondary battery, comprising:
   an electrode current collector; and
   a cathode mixture layer formed on the electrode current collector,
   wherein the cathode mixture layer includes the cathode material for a lithium-ion secondary battery according to claim 1.

8. A lithium-ion secondary battery comprising:
   the cathode for a lithium-ion secondary battery according to claim 7.

9. A method for manufacturing the cathode material for a lithium-ion secondary battery according to claim 1, the method comprising:
   manufacturing central particles and/or a precursor of the central particles;
   preparing a slurry by dissolving or dispersing an organic compound and at least one kind of central particle raw material, which is selected from the group consisting of the central particles and the precursor of the central particles, in water; and
   drying the slurry to generate dried substance and calcinating the obtained dried substance in a non-oxidative atmosphere,
   wherein, in the preparing of the slurry, a median diameter of the central particles in a particle size distribution, which is evaluated after dispersion treatment is adjusted to 100 nm or more and 160 nm or less, and a ratio (median diameter/crystallite diameter) of the median diameter to a crystallite diameter, which is calculated from crystallite diameters of the central particles before the dispersion treatment, is adjusted to 1.00 or more and 2.10 or less.

10. A cathode material for a lithium-ion secondary battery, the cathode material comprising:
    secondary particles which are granulated active material particles including central particles and a carbonaceous film that coats surfaces of the central particles, wherein
    a granulated body breakage degree ((a−b)/a) is 0.03 or more and 0.30 or less,
    the granulated body breakage degree is calculated based on a relative particle amount a, at which a maximum peak is shown in a particle size distribution of the secondary particles, and a relative particle amount b, at which a maximum peak in a particle size distribution of the secondary particles is shown after a dispersion treatment of the secondary particles is performed using a homogenizer, and
    the central particles are represented by general formula $Li_xFe_yM_zPO_4$ (here, M represents at least one element selected from the group consisting of Mg, Ca, Co, Sr, Ba, Ti, Zn, B, Al, Ga, In, Si, Ge, and rare earth elements, $0.95 \le x \le 0.10$, $0.80 \le y \le 1.10$, and $0.00 \le z \le 0.20$) and
    wherein the cathode material has the BET specific surface area of 5 m2/g or more and 13.1 m2/g or less, and
    wherein the amount of carbon included in the cathode material for a lithium-ion secondary battery, which is the amount of carbon forming the carbonaceous film, is 0.83 to 1.29 parts by mass with respect to 100 parts by mass of the central particles, wherein the dispersion treatment of the secondary particles is performed using the homogenizer at a rotation speed of 8,500 rpm and a treatment time of four minutes, and wherein 5C discharge capacity after 200 cycles is 72 to 98 mAh/g, when the cathode material is used in the lithium secondary battery.

\* \* \* \* \*